J. W. FELLMETH.
OPERATING MECHANISM FOR BRAKES, CLUTCHES, AND THE LIKE.
APPLICATION FILED AUG. 28, 1916.
1,224,621.
Patented May 1, 1917.
2 SHEETS—SHEET 1.
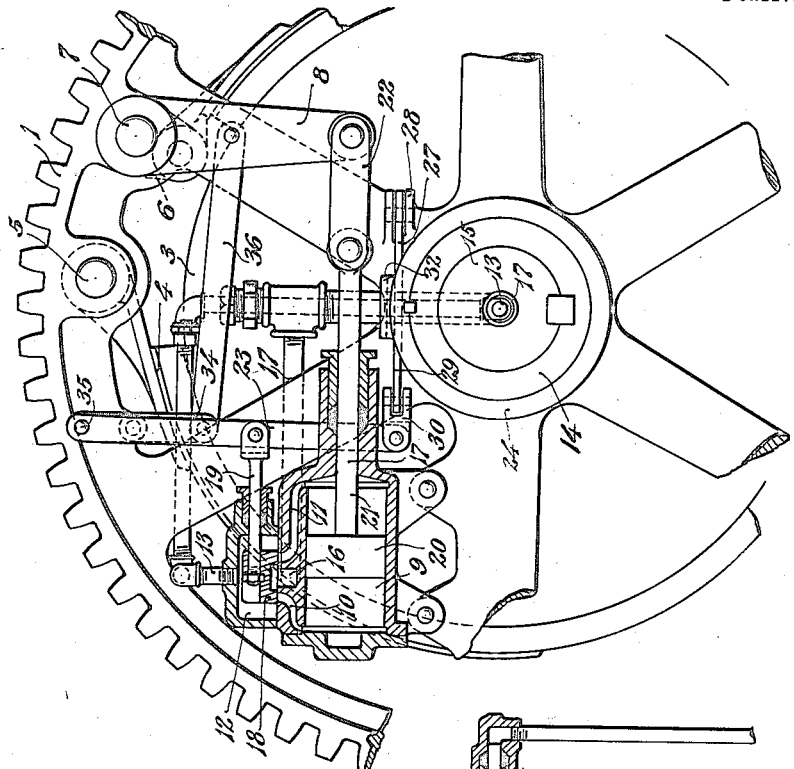
INVENTOR.
Jacob W. Fellmeth
BY
Edward Reed
ATTORNEY

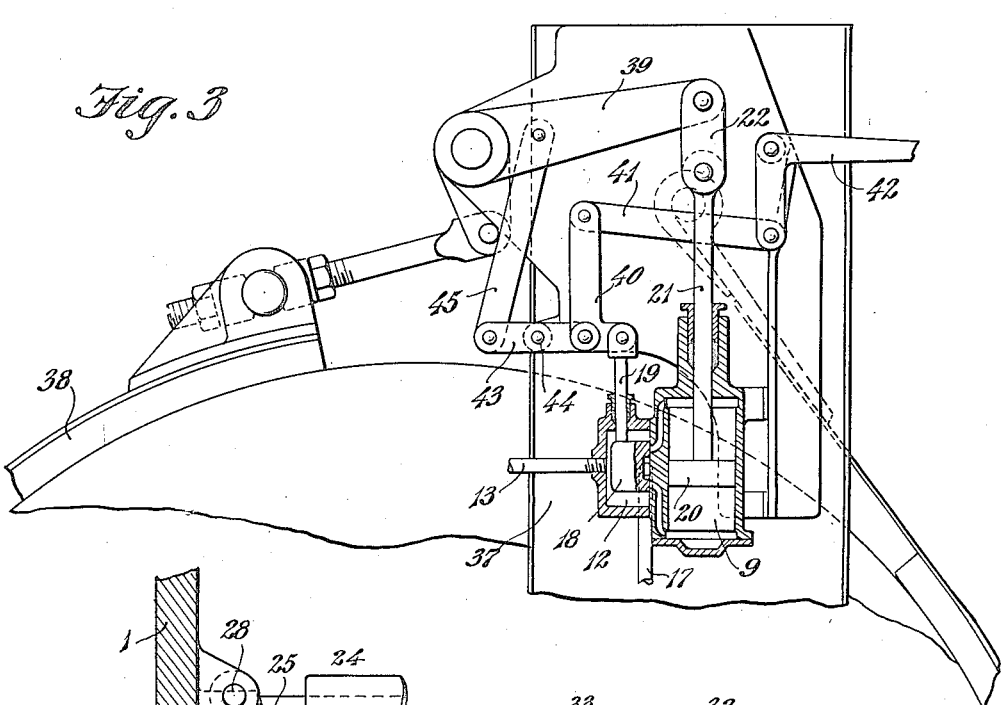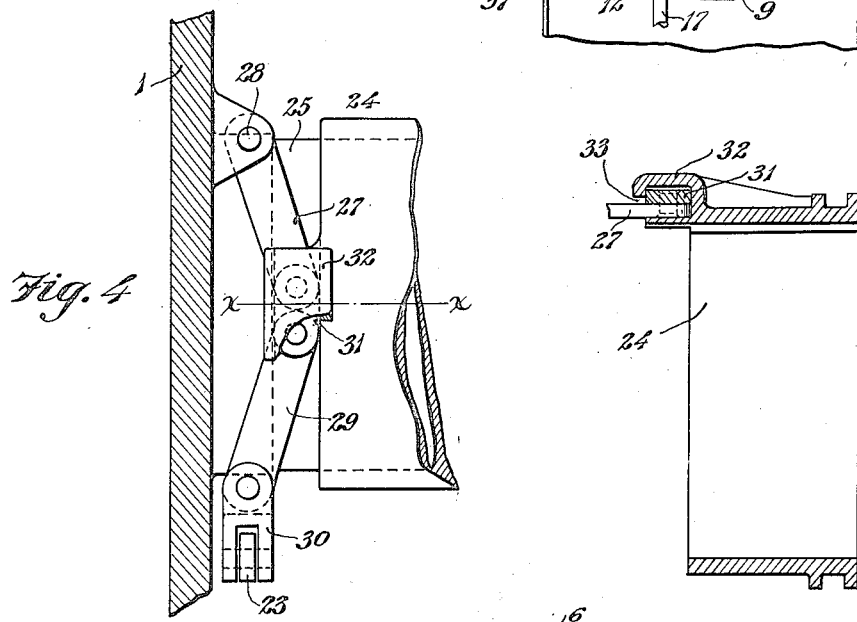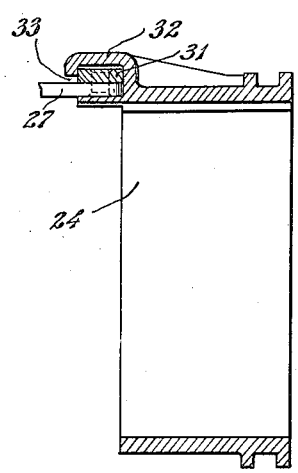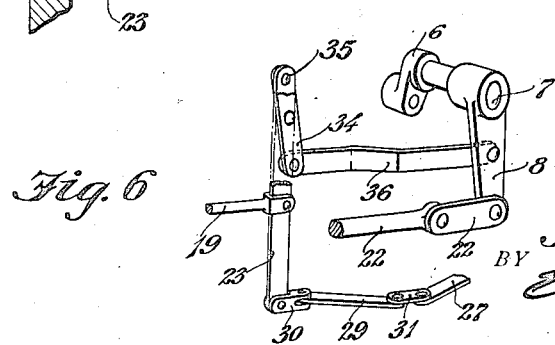

UNITED STATES PATENT OFFICE.

JACOB W. FELLMETH, OF MARION, OHIO, ASSIGNOR TO THE MARION STEAM SHOVEL CO., OF MARION, OHIO, A CORPORATION OF OHIO.

OPERATING MECHANISM FOR BRAKES, CLUTCHES, AND THE LIKE.

1,224,621.      Specification of Letters Patent.      Patented May 1, 1917.

Application filed August 28, 1916. Serial No. 117,152.

*To all whom it may concern:*

Be it known that I, JACOB W. FELLMETH, a citizen of the United States, residing at Marion, in the county of Marion and State of Ohio, have invented certain new and useful Improvements in Operating Mechanism for Brakes, Clutches, and the like, of which the following is a specification, reference being had therein to the accompanying drawing.

This invention relates to operating mechanism for brakes, clutches and the like and while designed more particularly for use in connection with the hoisting mechanism of an excavating machine, it is useful with various classes of machinery and particularly with hoisting mechanisms of different kinds.

Steam rams have been successfully used heretofore for operating the clutch of a hoisting drum of an excavating machine, but have not been entirely satisfactory where the clutch is used as a checking device to regulate the speed at which a load is lowered, as by the unwinding of the cable from the drum. The steam is admitted at one end of the drum only and after the device has been actuated to set the clutch to offer the desired resistance to the movement of the load, the expansion of the steam will impart a further movement to the piston of the ram and tighten the clutch; and further it is necessary to exhaust the steam from the ram before the piston can move in a reverse direction to move the friction member into an inoperative position and release the load, thus making it difficult, if not impossible, to secure a quick release of the load.

The object of the present invention is to provide a power operated mechanism for manipulating a brake, clutch, or the like, with which the friction member can be set in a selected position to offer the desired resistance to the movement of the load and will be automatically retained in that position; and further to provide such a device in which a reverse movement may be quickly imparted to the piston to release the clutch.

It is also an object of the invention to provide a mechanism of this kind which will be very simple in its construction and positive in its operation; and which will be of such a character that it can be mounted either upon a rotary support or upon a fixed support.

In these drawings Figure 1 is an end elevation of a mechanism embodying my invention, showing the supporting gear and friction devices partially broken away; Fig. 2 is a side elevation of the same; Fig. 3 is a slightly modified form of the invention showing the same mounted on a fixed support; Fig. 4 is a detail view of the operating toggle for the lever; Fig. 5 is a section taken on the line *x—x* of Fig 4; Fig. 6 is a detail perspective view of the floating lever mechanism; and Fig. 7 is a detail view of the steam pipes showing their connection with the shaft.

In these drawings I have illustrated two forms of a single embodiment of my invention, these forms differing slightly in their construction and arrangement to permit the one form to be mounted upon a rotary support and to permit the other form to be mounted upon a fixed support. As shown in Figs. 1 and 2 the mechanism as a whole is mounted upon a rotary driving member, or gear, 1, adapted to be connected with a hoisting drum by means of a friction clutch, which is also capable of acting as a brake. In the present construction the hoisting drum has secured thereto a friction drum 3 about which extends a friction band 4 secured to the driving member, or gear, 1, which thus constitutes a supporting device for the movable member of the clutch. The friction band, as here shown, is secured to the supporting gear at one end by means of a fixed stud 5 and is connected at its other end with a crank arm 6 carried by a stud or shaft 7 journaled in the supporting gear and having on its other end a crank 8 by means of which the stud, or shaft, may be rocked to move the friction band into or out of operative engagement with the friction drum 3. It will be understood however that this particular type of friction clutch, or brake, is used for the purpose of illustration only and that the invention is applicable to clutches of various kinds.

The mechanism is power operated and in the present embodiment of the invention I have utilized a double ended steam cylinder 9 which is mounted on and rigidly secured to the gear, or rotary clutch supporting device, 1. This cylinder is provided with steam passageways, 10 and 11, leading from the opposite ends of the cylinder to a steam chest 12 which is connected with a suitable source of steam supply by means of a steam pipe 13 extending through the hub 14 of the gear 1 and through the shaft 15 to which the gear is rigidly secured. The cylinder also has an exhaust passage 16 arranged between the two steam passageways and connected with an exhaust pipe 17 which also extends through the hub of the gear and through the shaft 15, the exhaust pipe being preferably arranged about the steam pipe, which is of smaller diameter than the exhaust pipe. The flow of the steam to and from the cylinder 9 is controlled by a D-valve 18 of ordinary construction, which is mounted in the steam chest 12 and provided with an actuating rod 19 extending beyond one end of the steam chest. Mounted within the cylinder 9 is a piston 20 having its piston rod 21 operatively connected with the crank arm, or actuating device, 8, for the friction member, the connection being preferably accomplished by means of a link 22 to accommodate it to the arc through which the end of the arm moves. By manipulating the valve 18 steam may be admitted to the cylinder on either side of the piston to cause the movable friction member of the clutch to be moved into either operative or inoperative relation to the fixed friction member, and by regulating the amount of movement imparted to the piston, the movable friction member can be moved into a position to offer the desired resistance to the movement of the other friction member and the part to which it is connected.

In order that the friction member may be set in the desired position, I have provided means for manually actuating the valve, independently of the position of the friction member, to admit steam to the cylinder on one side of the piston to set the friction member, and have provided other means which will be actuated by the movement of the friction member away from the position in which it has been set, as by the expansion of the steam in the cylinder, to shift the valve and admit steam to the cylinder on the opposite side of the piston and thus restore the piston, and consequently the friction member, to the positions in which they were set. The mechanism for accomplishing this is of such a character as to be very sensitive. A very slight movement of the piston and the friction member will serve to actuate the valve and restore the parts to their original position. This will take place before any material movement has been imparted to the friction member and after steam has been admitted to the cylinder on the other side of the piston, the piston will be balanced and there will be practicably no further movement either of the piston or of the friction member. Various mechanisms may be used for manipulating the valve, but in the present construction I have utilized a system of floating levers which accomplishes the result in a very satisfactory manner. As here shown, a lever 23 is pivotally connected between its ends with the valve rod 19. It is fulcrumed at one end on a normally fixed axis, and is connected at its other end with a manually operated actuating device. Preferably, this actuating device includes a collar 24 slidably mounted on the hub of the supporting gear 1 and having an annular groove to receive the usual shifting yoke 26. The movement of the lever is in a plane at right angles to the line of movement of the collar and, as a convenient method of transmitting the movement from the collar to the lever, I have utilized a toggle, one arm, 27, of which is pivotally mounted on the supporting member 1 on a fixed axis, as shown at 28, and the other arm, 29, of which is pivotally connected with the adjacent end of the lever 23, preferably by means of a link 30. The adjacent ends of the arms, 27 and 29, are pivotally connected one to the other and while the connection may be a direct one, I have, in the present instance, employed a short link 31 to which the ends of the toggle arms are pivoted and which is slidably mounted in a housing, or guideway, 32, rigidly secured to and preferably formed integral with the collar 24 and having an opening or slot 33 through which the arms extend. This manner of connecting the toggle with the collar permits the connected ends of the arms to travel transversely of the collar as the arms move about the axes at the outer ends thereof. Obviously, the movement of the toggle about its fixed axis 28 will impart longitudinal movement to the arm 29 thereof and rock the lever 23 about its normally fixed fulcrum, thereby imparting movement to the valve 18. After sufficient steam has been admitted to the cylinder to set the friction member in the desired position, the valve is moved into its neutral position in which both the steam passageways, 10 and 11, of the cylinder are closed. To enable the valve to be shifted in a reverse direction by the further movement of the piston in the same direction, I have operatively connected the valve with the friction member, preferably by connecting the lever 23 with the crank arm 8 of the friction member. This connection, as here shown, comprises a lever 34 pivotally mounted between its ends on the gear, or supporting member, 1, and pivotally connected at its outer end with the adjacent end of the lever 23, as shown at 35. This pivotal connection forms a fulcrum for the lever 23, and inasmuch as the lever 34 is normally stationary, or substantially stationary, the fulcrum is normally fixed relatively to that end of the lever which is connected with the toggle. The inner end of the lever 34 is connected by means of a link 36 with the crank arm 8 for the friction member.

The operation of the device will be readily understood from the foregoing description and assuming that the valve 18 has been opened to admit steam to the lefthand end of the cylinder in sufficient quantities to move the piston to the position shown in Fig. 2 and the valve then closed, should the expansion of the steam cause a further movement of the piston to the right and thus cause a further movement of the crank arm 8, this movement will be imparted to the lever 34 and from this lever to the lever 23. Inasmuch as the collar 24 is now stationary, the toggle is held against movement and the pivotal connection between the inner end of the lever 23 and the toggle constitutes a substantially fixed fulcrum about which the lever 23 moves, thus moving the valve 18 in a direction to open the steam passageway 11 and admit steam to the righthand end of the cylinder. This passageway will remain open until sufficient steam has entered the cylinder to move the cylinder to the position in which it was originally set. The return movement of the piston operates the valve through the same floating levers to close the valve and thus confine the steam in the cylinder on both sides of the piston and effectually prevents further movement thereof.

In Fig. 3 I have shown a slightly modified form of the invention to adapt it to be mounted on a fixed support. As here shown, the power operated device, or motor, is of substantially the same construction as that above described, but is mounted on a fixed frame member 37. The same type of friction clutch is shown, but the ends of the friction band 38 are mounted on the fixed support 37 instead of upon the rotary support. The friction band has an actuating crank arm 39 which is connected with the piston of the motor. The manual operation of the valve is accomplished by means of a bell crank lever 40, one arm of which is connected with the valve rod and the other arm of which is connected by means of a link 41 and a second bell crank lever 42 with an actuating lever. The operative movement of the link 41 is in a lengthwise direction, and, in the position of the parts shown in Fig. 3, a rocking movement will be imparted thereby to the bell crank lever 40, the axis of which is normally fixed. Preferably, the bell crank lever 40 is mounted on a lever 43 which is pivotally mounted between its ends on the frame 37, as shown at 44, and is connected at that end opposite the bell crank 40 with a link 45, the other end of which is connected with the crank arm 39 of the clutch member. When the piston has been set by the manual manipulation of the valve through the bell crank 40 and the link 41, the valve is closed and any further movement of the piston will actuate the arm 39 and this movement will be imparted to the link 45 and to the lever 43. The bell crank lever 42, by means of which the link 41 is operated, being held against movement, the link 41 will hold the bell crank 40 against movement about its axis and will cause the same to move with the lever 43, this movement being permitted by the swinging of the link 41, thus shifting the valve and admitting steam to the cylinder to restore the piston to its original position.

It will also be apparent that the mechanism is very simple both in its construction and operation and that it comprises no parts difficult of manufacture or maintenance, and that it requires no fine adjustments difficult to accomplish and to maintain. Further, it will be apparent that the automatic valve controlling mechanism will operate regardless of the condition of the friction member or the amount of movement necessary to be imparted to the same to move it into engagement with its coöperating member. It is immaterial whether the friction member is new or is nearly worn out. In either instance steam is admitted to the cylinder and the piston actuated to move the friction member into its operative position, and after the valve has been closed the automatic controlling mechanism will act upon the valve in the same manner regardless of the amount of initial movement that was imparted to the piston to set the friction member in its operative position.

While I have shown and described the invention as applied to a friction clutch, or brake, and as embodying a steam engine, or motor, it will be understood that the invention is not limited to either of these instrumentalities. The mechanism described may be used for adjusting and maintaining in adjusted positions various devices other than clutches or brakes and the power operated device, or motor, need not necessarily be a steam motor, as the controlling members for motors of various kinds can be actuated in substantially the same manner as the valve of the steam engine is actuated. Further, I wish it to be understood that I do not desire to be limited to the details of the mechanism shown and described for obvious modifications will occur to a person skilled in the art.

Having now fully described my invention, what I claim as new, and wish to secure by Letters Patent, is:—

1. The combination with a brake and a power operated device for manipulating the same, of manually controlled means to control the operation of said device to cause said brake to be set in a selected position, and means controlled by said brake to cause it to be retained in said selected position.

2. The combination with a brake, a power operated device for manipulating the same and a controlling member for said device, of means to actuate said controlling member to cause said device to set the brake in a selected position, and means controlled by the brake to actuate said controlling member when said brake moves from said selected position.

3. The combination with a brake, an actuating arm therefor, a power operated device connected with said arm and a controlling member for said device, of means to actuate said controlling member, and an operative connection between said controlling member and said actuating arm to cause the movement of said arm to actuate said controlling member and cause the operation of said power operated device.

4. The combination with a brake and a fluid operated device to manipulate the same, of means to cause said brake to be set in a selected position and to automatically cause said fluid operated device to be actuated to restore said brake to said selected position when it has moved therefrom.

5. The combination with a brake and a fluid operated device for manipulating the same, of manually operated means to control said fluid operated device to cause said brake to be set in a selected position, and other means controlled by the movable member of the brake to control said fluid operated device to cause said brake to be retained in said selected position, said controlling means being capable of operation independently of each other.

6. The combination with a brake, a fluid operated device for manipulating the same and a valve to control said fluid operated device, of a manually operated device connected with said valve to actuate the same, and a connection between said valve and the movable member of said brake to cause said valve to be actuated by the movement of said movable member.

7. The combination with a brake, a fluid operated device for manipulating the same and a valve to control said fluid operated device, of a manually operated device connected with said valve to actuate the same, and a connection between said valve and the movable member of said brake to cause said valve to be actuated by the movement of said movable member, the connections between said valve and said manually operated device and said movable member of said brake being such that either may be operated to actuate the valve without disturbing the position of the other.

8. The combination with a friction member, a fluid operated device connected with said friction member and a valve to control said device, of means to actuate said valve to cause said device to move said friction member into a selected position, and means controlled by said friction member to actuate said valve to cause said device to retain said member in said selected position.

9. The combination with a friction member, a fluid operated device operatively connected with said member and a valve to control said device, of means to actuate said valve independently of said friction member, and a connection between said friction member and said valve to cause the latter to be operated by the movement of said friction member.

10. The combination with a friction member, a cylinder, a piston mounted in said cylinder and connected with said friction member, and a valve to control the flow of fluid to said cylinder, of means to actuate said valve to admit fluid to said cylinder on one side of said piston to move said friction member into a selected position, and means controlled by said friction member to actuate said valve to admit fluid to said cylinder on the other side of said piston when said friction member moves beyond said selected position.

11. The combination with a friction member, a fluid operated device operatively connected with said friction member and a valve to control said device, of a lever connected with said valve and operatively connected with said friction member, and a manually controlled device operatively connected with said lever.

12. In a brake, the combination with a movable member, a fluid operated device to actuate the same, and a valve to control said fluid operated device, of a lever connected between its ends with said valve, a manually operated device pivotally connected with one end of said lever, and a pivotal connection between the other end of said lever and said movable member of said brake, whereby the operation of said manually operated device will cause said lever to fulcrum about the last-mentioned pivotal connection, and the movement of said movable member will cause said lever to fulcrum about the first-mentioned pivotal connection.

13. The combination with a friction member, a fluid operated device operatively connected with said friction member and a valve to control said device, of a lever pivotally mounted on an axis fixed with relation to said valve, a second lever pivotally mounted on the first-mentioned lever and connected with said valve, manually controlled means for actuating said second lever, and an operative connection between said first-mentioned lever and said friction member.

14. The combination with a friction member, a fluid operated device operatively connected with said friction member, a valve to control said device and an actuating arm connected with said friction member and with said fluid operated device, of a lever connected with said valve, manually controlled means for actuating said lever to shift said valve and thereby cause said friction member to be set in a selected position, and a connection between said lever and said actuating arm to cause said lever to actuate said valve when said friction member moves from said selected position.

15. The combination with a friction member, a fluid operated device operatively connected with said friction member, a valve to control said device and an actuating arm connected with said friction member and with said fluid operated device, of a lever connected with said valve, manually controlled means for actuating said lever to manipulate said valve and cause said friction member to be moved into a selected position, and a connection between said lever and said actuating arm to cause the lever to manipulate said valve to reverse the direction of movement of said actuating arm when said friction member moves from its adjusted position.

16. The combination with a friction member, a fluid operated device operatively connected with said friction member, and a valve to control said device, of a lever pivotally mounted on an axis fixed with relation to said valve, a second lever pivotally mounted on the first-mentioned lever on one side of its axis, an actuating device connected with said second lever, and a device connected with the first-mentioned lever on the other side of its axis to connect the same with said friction member.

17. The combination with a friction member, a fluid operated device operatively connected with said friction member, and a valve to control said device, of a lever pivotally mounted on an axis fixed with relation to said valve, a second lever connected with said valve, extending across the axis of the first-mentioned lever and pivotally connected therewith at a point beyond said axis, a device connected with said first-mentioned lever on that side of its axis opposite its connection with said second lever to connect the same with said friction member, and an actuating device connected with said second lever.

18. The combination with a friction member, a fluid operated device operatively connected with said friction member, and a valve to control said device, of a lever pivotally mounted on an axis fixed with relation to said valve, a second lever mounted on the first-mentioned lever for movement either with or independently of the same and connected with said valve, manually controlled means for actuating said second lever independently of the first mentioned lever, and a connection between the first-mentioned lever and said friction member for actuating both the first-mentioned lever and said second lever.

19. The combination with a friction member, a cylinder having passages leading to the opposite ends thereof, a valve to control the flow of steam through said passages, and a piston mounted in said cylinder and connected with said friction member, of an actuating device for said valve, manually controlled means for imparting one movement to said device to open the passage leading to one end of said cylinder, and means controlled by said friction member to automatically move said device in the other direction to open the passage leading to the opposite end of said cylinder.

20. The combination with a friction member, a cylinder having passages leading to the opposite ends thereof, a valve to control the flow of steam through said passages, and a piston mounted in said cylinder and connected with said friction member, of a lever pivotally connected between its ends with said valve, a manually controlled device connected with one end of said lever for actuating said valve, and a connection between the other end of said lever and said friction member for automatically actuating said valve.

21. The combination with a friction member, a cylinder having passages leading to the opposite ends thereof, a valve to control the flow of steam through said passages, and a piston mounted in said cylinder and connected with said friction member, of a lever pivotally mounted on an axis fixed with relation to said valve, a second lever pivotally mounted on the first-mentioned lever, a manually controlled actuating device connected with said second lever for manipulating said valve to open the passage leading to one end of said cylinder, and a connection between the first-mentioned lever and said friction member to actuate both the levers and move said valve to open the passage leading to the other end of said cylinder.

22. The combination with a friction member, a cylinder having passages leading to the opposite ends thereof, a valve to control the flow of steam through said passages, and a piston mounted in said cylinder and connected with said friction member, of a lever pivotally mounted on an axis fixed with relation to said valve, a second lever pivotally mounted on the first-mentioned lever on one side of its axis and connected with said valve, a manually controlled device connected with said second lever to shift said valve to open the passage leading to one end of said cylinder and thus cause said friction member to be moved into a selected position, a connection between said friction member and that end of said first-mentioned lever opposite its point of connection with said second lever to actuate both levers and cause the valve to open that passage leading to the opposite end of said cylinder when said friction member moves beyond said selected position.

23. The combination with a friction member, a fluid operated device operatively connected with said friction member, and a valve to control said device, of an actuating device connected with said valve, a toggle having one arm pivoted on a fixed support and the other arm connected with said actuating device, and an operating part connected with said toggle between said points of connection.

24. The combination with a friction member, a fluid operated device operatively connected with said friction member, and a valve to control said device, of an actuating device connected with said valve, a toggle having one arm pivoted on a fixed support and the other arm connected with said actuating device, a collar having a guideway arranged lengthwise of said toggle in which the joint of said toggle is mounted, whereby the movement of said collar will actuate said toggle and permit said joint to travel transversely to the line of movement of the collar.

25. The combination with a friction member, a fluid operated device operatively connected with said friction member, and a valve to control said device, of an actuating device connected with said valve, a toggle having one arm pivoted on a fixed support and the other arm connected with said actuating device, a link connecting the adjacent ends of the two arms of said toggle, and a collar having a guideway in which said link is mounted.

26. The combination with a brake, a fluid operated device comprising a movable member, and a connection between said movable member and said brake, of means to cause said brake to be set in a selected position and to automatically admit fluid to said device to actuate said movable member and restore said brake to said selected position when it has moved therefrom.

27. The combination with a brake, a fluid operated device comprising a movable member, and an operative connection between said movable member and said brake, of means to admit fluid to said device to move said movable member in one direction, and means to automatically admit fluid to said device to move said movable member in the opposite direction to restore said brake to said selected position when it has moved beyond the same.

In testimony whereof, I affix my signature hereto.

JACOB W. FELLMETH.